(12) United States Patent
Gong

(10) Patent No.: US 9,161,180 B2
(45) Date of Patent: *Oct. 13, 2015

(54) SYSTEM FOR STATION GROUP MANAGEMENT AND METHOD FOR MANAGING STATION-MANAGEMENT GROUPS

(75) Inventor: Xiaohong X. Gong, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 582 days.

This patent is subject to a terminal disclaimer.

(21) Appl. No.: 13/461,909

(22) Filed: May 2, 2012

(65) Prior Publication Data

US 2012/0213122 A1 Aug. 23, 2012

Related U.S. Application Data

(63) Continuation of application No. 12/842,239, filed on Jul. 23, 2010, now Pat. No. 8,194,687.

(51) Int. Cl.
*H04L 12/28* (2006.01)
*H04W 4/08* (2009.01)
*H04W 8/18* (2009.01)
*H04J 1/16* (2006.01)
*H04B 7/04* (2006.01)
*H04W 88/08* (2009.01)

(52) U.S. Cl.
CPC ............... *H04W 4/08* (2013.01); *H04W 8/186* (2013.01); *H04B 7/0452* (2013.01); *H04W 88/08* (2013.01)

(58) Field of Classification Search
USPC .................................. 370/401, 252, 329, 430
See application file for complete search history.

(56) References Cited

U.S. PATENT DOCUMENTS

| 7,826,848 | B2 * | 11/2010 | Tao et al. ...................... 455/436 |
| 8,072,922 | B2 | 12/2011 | Sinnarajah et al. |
| 8,855,067 | B2 * | 10/2014 | Liu et al. ....................... 370/329 |
| 2004/0009755 | A1 | 1/2004 | Yoshida |
| 2012/0020230 | A1 * | 1/2012 | Chen et al. ..................... 370/252 |

(Continued)

FOREIGN PATENT DOCUMENTS

| CN | 1461159 A | 12/2003 |
| CN | 1929638 A | 3/2007 |

(Continued)

OTHER PUBLICATIONS

"U.S. Appl. No. 12/842,239, Notice of Allowance mailed Mar. 26, 2012", 10 pgs.
"International Application Serial No. PCT/US2011/043732, International Search Report mailed Feb. 9, 2012", 3 pgs.
"International Application Serial No. PCT/US2011/043732, Written Opinion mailed Feb. 9, 2012", 5 pgs.

(Continued)

*Primary Examiner* — John Pezzlo
(74) *Attorney, Agent, or Firm* — Schwegman Lundberg & Woessner, P.A.

(57) ABSTRACT

Embodiments of a system for station group management and a method for managing station-management groups in a wireless network are generally described herein. In some embodiments, a system element, such as an access point, may establish a station-management group including selected stations, transmit a unicast group allocation message to a station to indicate whether the station is part of the station management group, transmit data frames to the station in a downlink (DL) multi-user multiple-input multiple-output (MU-MIMO) transmission, and delete the station from the station-management group.

54 Claims, 6 Drawing Sheets

STATE DIAGRAM FOR AN ACCESS POINT CONFIGURED FOR EXPLICIT GROUP DELETION

(56) References Cited

U.S. PATENT DOCUMENTS

| | | |
|---|---|---|
| 2012/0020243 A1 | 1/2012 | Gong X |
| 2013/0121234 A1* | 5/2013 | Shrivastava et al. ......... 370/312 |
| 2014/0307726 A1* | 10/2014 | Kang et al. ................... 370/338 |
| 2015/0139346 A1* | 5/2015 | Ko et al. ........................... 7/417 |

FOREIGN PATENT DOCUMENTS

| | | |
|---|---|---|
| CN | 101541024 A | 9/2009 |
| JP | 200762413 A | 3/2007 |
| JP | 2009231861 A | 10/2009 |
| JP | 2010028737 A | 2/2010 |
| JP | 2010081360 A | 4/2010 |
| JP | 2011515052 A | 5/2011 |
| JP | 2012514904 A | 6/2012 |
| WO | WO-2007102546 A1 | 9/2007 |
| WO | WO-2009111457 A1 | 9/2009 |
| WO | WO-2010078599 A2 | 7/2010 |
| WO | WO-2012012229 A2 | 1/2012 |
| WO | WO-2012012229 A3 | 1/2012 |

OTHER PUBLICATIONS

"International Application Serial No. PCT/US2011/043732, International Preliminary Report on Patentability mailed Jan. 31, 2013", 6 pgs.

"Japanese Application Serial No. 2013-520741, Office Action mailed Dec. 24, 2013", 4 pgs.

"Korean Application Serial No. 10-2013-7004506, Notice of Preliminary Rejection mailed May 30, 2014", 4 pgs.

"Korean Application Serial No. 10-2013-7004506, Voluntary Amendment filed Feb. 22, 2013", 20 pgs.

"Chinese Application Serial No. 201180045785.9, Office Action mailed Jan. 22, 2015", W/English Translation, 18 pgs.

"European Application Serial No. 11810167.4, Office Action mailed Apr. 5, 2013", 2 pgs.

"European Application Serial No. 11810167.4, Response filed Sep. 24, 2013 to Office Action mailed Apr. 5, 2013", 15 pgs.

"Korean Application Serial No. 10-2013-7004506, Response filed Sep. 1, 2014 to Notice of Preliminary Rejection mailed May 30, 2014", W/ English Claims, 38 pgs.

* cited by examiner

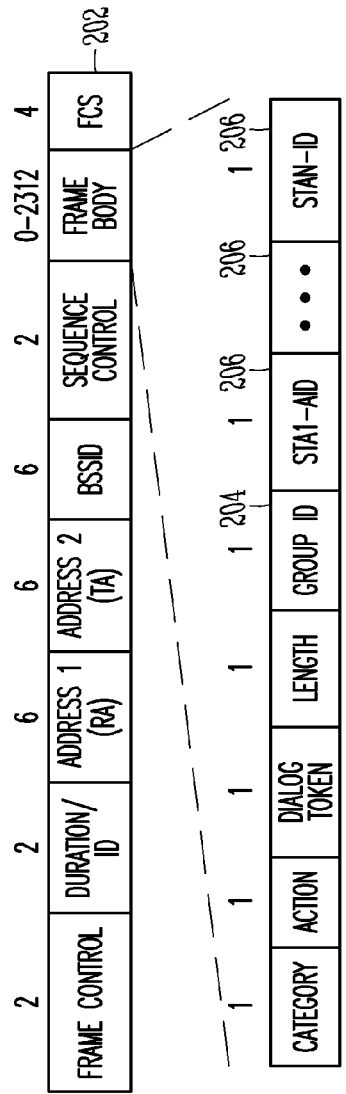
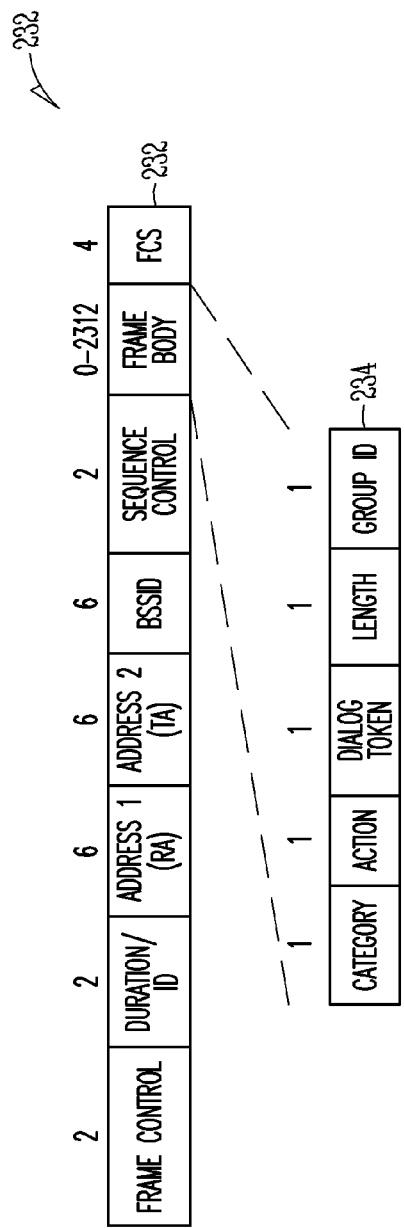

STATE DIAGRAM FOR AN ACCESS POINT CONFIGURED FOR EXPLICIT GROUP DELETION

STATE DIAGRAM FOR A MOBILE STATION CONFIGURED FOR EXPLICIT GROUP DELETION (IMPLICIT GROUP DELETION)
FRAME FORMAT OF A GROUP ALLOCATION FRAME

STATE DIAGRAM FOR AN ACCESS POINT CONFIGURED FOR IMPLICIT GROUP DELETION

STATE DIAGRAM FOR A MOBILE STATION CONFIGURED FOR IMPLICIT GROUP DELETION

SYSTEM FOR STATION GROUP MANAGEMENT AND METHOD FOR MANAGING STATION-MANAGEMENT GROUPS

This application is a continuation of U.S. patent application Ser. No. 12/842,239, filed on Jul. 23, 2010, now issued as U.S. Pat. No. 8,194,687, which is incorporated herein by reference in its entirety.

TECHNICAL FIELD

Embodiments pertain to wireless communications including wireless-fidelity (WiFi) communications. Some embodiments relate to multi-user multiple-input multiple-output (MU-MIMO) communications. Some embodiments pertain to MU-MIMO systems that use a downlink space-division multiple access (DL-SDMA) technique. Some embodiments pertain to MU-MIMO systems that operate in accordance with one of the IEEE 802.11 standards, such as the 802.11ac standard.

BACKGROUND

MU-MIMO systems use multiple spatial channels to transmit and receive signals to/from multiple stations at the same time using two or more antennas. In a MU-MIMO system, the signals for the different stations are precoded for transmission on different spatial channels, allowing the stations to separate out the data intended for a particular station. One issue with MU-MIMO systems is managing and maintaining groups of stations.

Thus there are general needs for access points configured for station group management and methods for managing station-management groups.

BRIEF DESCRIPTION OF THE DRAWINGS

FIG. 2A illustrates the frame format of a group allocation message configured for explicit deletion of station-management groups in accordance with some embodiments;

FIG. 2B illustrates the frame format of a group deletion message in accordance with some embodiments;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
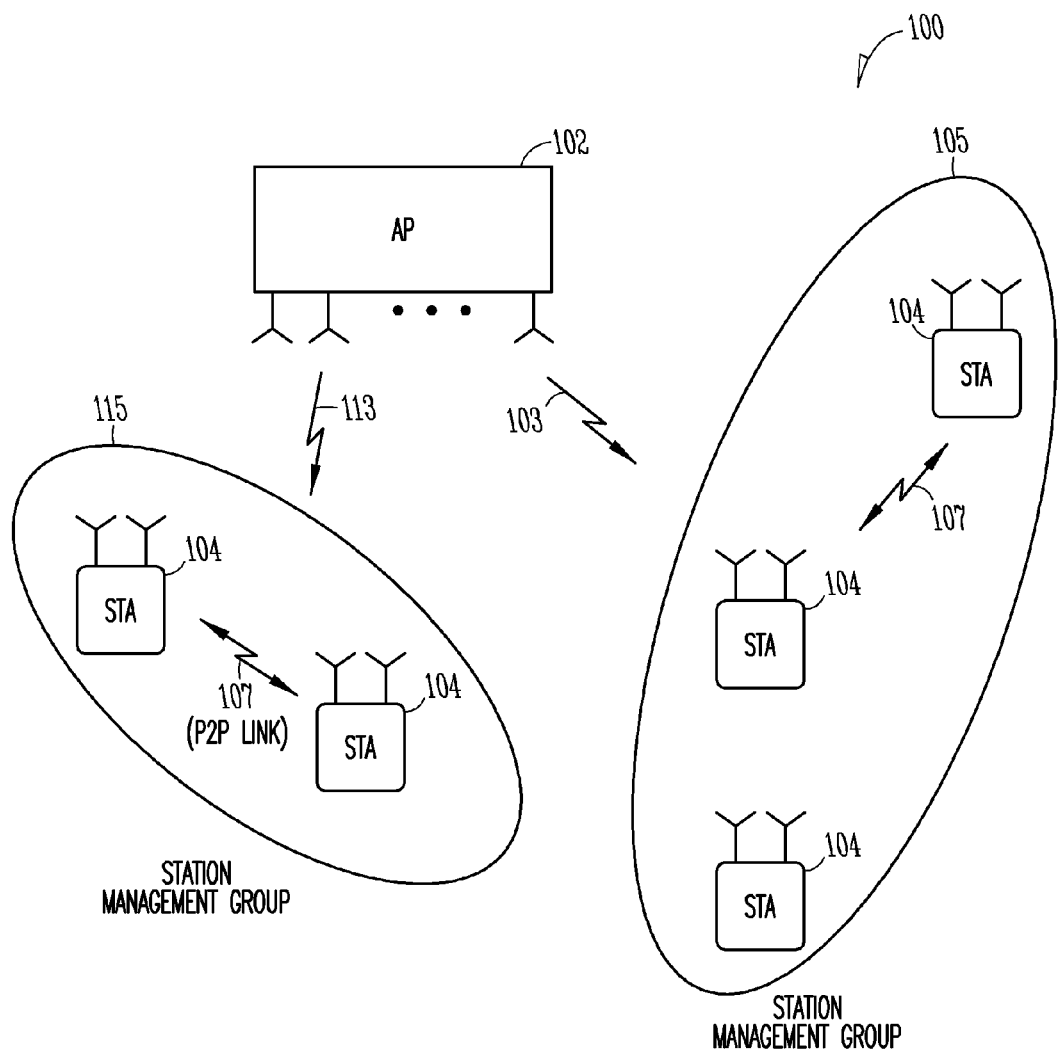
FIG. 1 illustrates a basic service set (BSS) in accordance with some embodiments.

FIG. 1 illustrates a basic service set (BSS) in accordance with some embodiments. BSS 100 includes an access point (AP) 102 and a plurality of associated communication stations (STA) 104. In accordance with embodiments, the access point 102 is configured to transmit data frames to the stations 104 that are part of a station-management group using a MU-MIMO technique. As described in more detail below, the access point 102 may establish, maintain and delete one or more station-management groups, such as station-management group 105 and station-management group 115, within the BSS 100. Stations 104 may also maintain non-interfering peer link groups with peer-to-peer links 107.

As illustrated in FIG. 1, the access point 102 is configured to transmit data frames 103 to the stations 104 that are part of station-management group 105 using a MU-MIMO technique. The access point 102 may also be configured to transmit data frames 113 to the stations 104 that are part of station-management group 115 using a MU-MIMO technique. Data frames 103 transmitted to the stations 104 of the station-management group 105, and data frames 113 transmitted to the stations 104 of the station-management group 115 may be referred to as downlink (DL) MU-MIMO transmissions, which are described in more detail below.

In accordance with embodiments, the access point 102 may select stations 104 for a station-management group 105 and transmit a group allocation message to the selected stations 104. The access point 102 may also establish a station-management group 105 that includes stations 104 from which response frames were received. A response frame may be an acknowledge (ACK) frame or a frame that includes channel-state information (CSI) feedback. While the station-management group 105 is established, the access point 102 may transmit data frames 103 to the stations 104 of the station-management group 105 using a MU-MIMO technique.

The access point 102 may also either explicitly delete a station 104 from the station-management group 105 by transmitting a group deletion message to the station 104, or implicitly delete a station 104 from the station-management group 105 by refraining from transmitting DL MU-MIMO transmissions or group update messages to the station 104. These embodiments are described in more detail below.

The access point 102 and the stations 104 of BSS 100 may implement a carrier-sense multiple access technique (CSMA) for accessing the wireless medium, such as the carrier-sense multiple access with collision avoidance (CSMA/CA) technique of IEEE 802.11. The access point 102 and the stations 104 may also implement a MU-MIMO technique of IEEE 802.11

The access point 102 and stations 104 may include several separate functional elements to implement the operations described herein, including a radio transceiver, processing circuitry and memory. One or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein.

In some embodiments, stations 104 may be a fixed or mobile wireless communication device, such a personal digital assistant (PDA), a laptop or portable computer with wireless communication capability, a smart phone, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

FIG. 2A illustrates the frame format of a group allocation message configured for explicit deletion of station-management groups in accordance with some embodiments. The group allocation message 202 may be transmitted by the access point 102 (FIG. 1) to indicate to which of stations 104 (FIG. 1) are selected to be part of a station-management group 105 (FIG. 1). The numbers above each field of the group allocation message 202 may indicate the length of each of the fields in octets.

In accordance with embodiments, the group allocation message 202 includes a group identification (ID) field 204 within the frame body to identify the station-management group 105 and a plurality of associated identifier (AID) fields 206 to identify the associated IDs of the stations 104 that are being selected for the station-management group 105. The group allocation message 202 may be transmitted in either a broadcast or a unicast fashion. When transmitted in a broadcast fashion, the receiver address (RA) of the group allocation message 202 is the broadcast address.

The frame body of the group allocation message 202 may also include a category field and an action field indicating that the message is a group allocation message, and a length field indicating the length of the frame body.

FIG. 2B illustrates the frame format of a group deletion message in accordance with some embodiments. The group deletion message 232 may be transmitted by an access point 102 (FIG. 1) to delete an established station-management group 105 (FIG. 1) or to remove one or more stations 104 (FIG. 1) from the established station-management group 105. The numbers above each field of the group allocation message 232 may indicate the length of each of the fields in octets. When configured to remove one or more stations from a station-management group, the group deletion message 232 may be considered a station deletion message.

The group deletion message 232 may be addressed to the one or more stations 104 of the station-management group 105 that are to be deleted. The group deletion message 232 may include a group ID field 234 in the frame body to identify the station-management group 105. The group deletion message 232 may be addressed to the stations being removed from the group using the RA field.

The frame body of the group deletion message 232 may also include a category field and an action field indicating that the message is a group allocation message, and a length field indicating the length of the frame body.

Figure 2C:
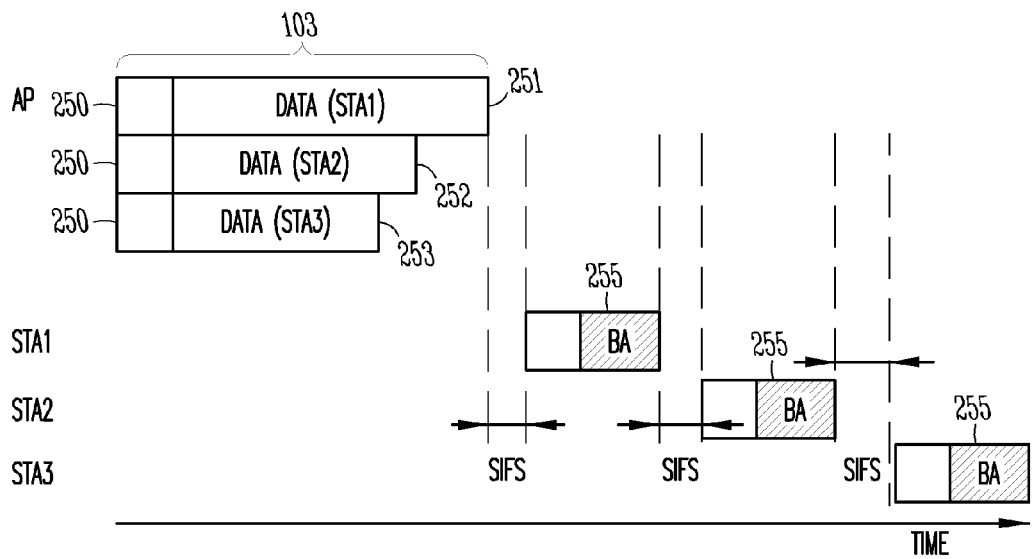
FIG. 2C illustrates a DL MU-MIMO transmission in accordance with some embodiments.

FIG. 2C illustrates a DL MU MIMO transmission in accordance with some embodiments. The DL MU MIMO transmission 240 may be transmitted by an access point to stations that are part of an established station-management group. The DL MU MIMO transmission 240 may correspond to data frames 103 (FIG. 1) that are transmitted in accordance with a MU-MIMO technique to station management group 105 (FIG. 1), or data frames 113 (FIG. 1) that are transmitted in accordance with a MU-MIMO technique to station management group 115 (FIG. 1). The DL MU MIMO transmission 240 may comprise a concurrent transmission of spatially-separated data packets 250 to at least some of the stations 104 of a station-management group.

As illustrated in FIG. 2C, the spatially-separated data packets 250 may comprise a plurality of individual data packets, such as data packet 251, data packet 252 and data packet 253, transmitted concurrently within the same frequency spectrum. Data packet 251 may be intended for a first station (STA1), data packet 252 may be intended for a second station (STA2) and data packet 253 may be intended for a third station (STA3). Although individual data packets 251, 252, 253 are separately illustrated in FIG. 2C, this does not imply that they are transmitted on separate frequency channels.

In some embodiments, each data packet 250 may be separately precoded for receipt by the receiving stations. These embodiments are described in more detail below.

The spatially-separated individual data packets 250 may be transmitted concurrently on the same frequency channel, which may comprise the same set of orthogonal frequency division multiplexed (OFDM) frequency subcarriers. Each of the individual data packets 250 may be addressed to and precoded for receipt by one of the stations 104 of the station-management group 105. In these embodiments, the individual data packets may be transmitted at the same time and each data packet 250 may be transmitted on a different spatial channel. In these embodiments, a DL MU MIMO or a DL SDMA technique may be employed.

In some embodiments, a single frequency channel may be used to transmit the DL MU MIMO transmission 240. In some IEEE 802.11ac embodiments, a primary frequency channel and up to seven secondary frequency channels may be used to transmit the DL MU-MIMO transmissions 240. Each frequency channel may be a 20-MHZ frequency channel and may use a plurality of OFDM subcarriers.

The plurality of individual data packets 250 of the DL MU-MIMO transmission 240 may be transmitted as a single frame by the access point 102 in accordance with a CSMA/CA technique. After transmission of the individual data packets 250, the access point 102 may receive individual acknowledgements 255, such as block acknowledgements (BA) 255, from the stations 104 of the station-management group 105. The acknowledgements 255 may be transmitted by the stations in accordance with a CSMA/CA technique on the same frequency channel in response to receipt of the DL MU-MIMO transmission 240. Although block acknowledgements 255 are illustrated in FIG. 2C, this does not imply that they are transmitted on different frequency channels.

A DL MU-MIMO transmission 240 may be a single frame that may include, among other things, one or more training fields and one or more signaling fields. A DL MU-MIMO transmission 240 may be configured in accordance with an IEEE 802.11 standard.

Figure 3:
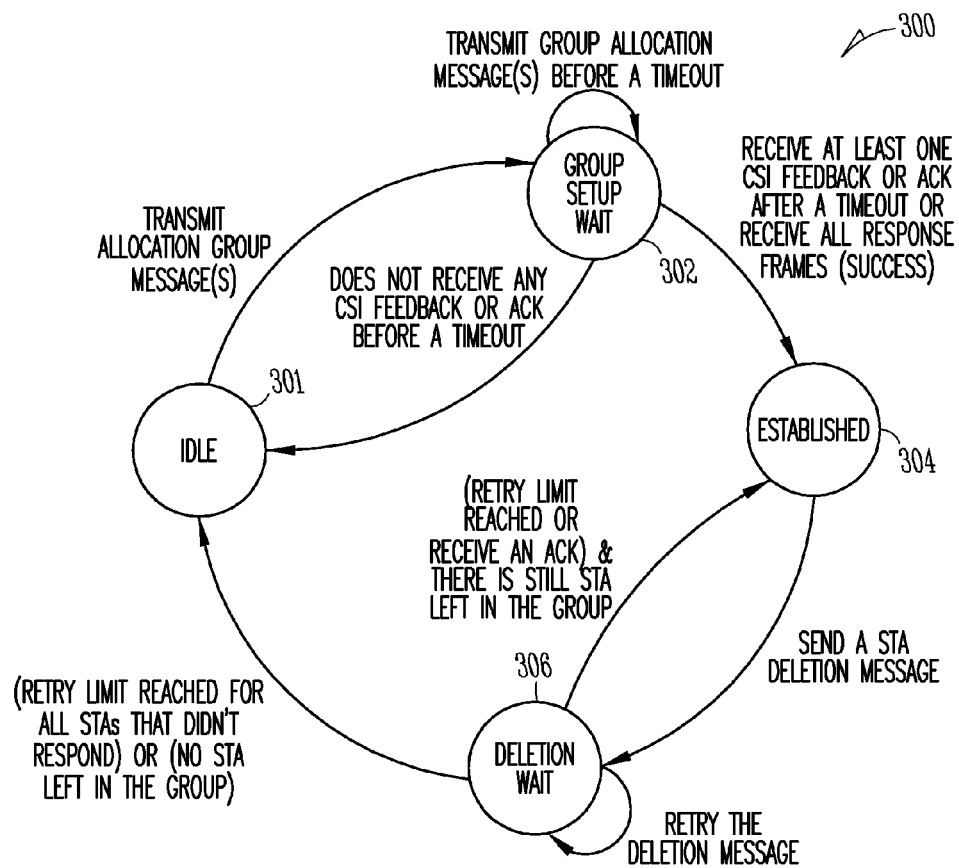
FIG. 3 is a state diagram for an access point configured for explicit deletion of station-management groups in accordance with some embodiments.

FIG. 3 is a state diagram for an access point configured for explicit deletion of station-management groups in accordance with some embodiments. An access point, such as access point 102 (FIG. 1), may operate in accordance with state diagram 300. During idle state 301, the access point 102 is idle with respect to station group management activities. After transmitting a group allocation message, such as group allocation message 202 (FIG. 2A), to selected stations 104 (FIG. 1), the access point 102 may enter the group setup wait state 302. When response frames are received from one or more of the selected stations 104, the access point 102 may establish a station-management group 105 to include stations 104 from which response frames are received and enter the established state 304. While in the established state 304, the access point 102 may transmit a DL MU-MIMO transmission 240 to the stations 104 of the established station-management group 105 using a MU-MIMO technique. While in the established state 304, the access point 102 may explicitly delete the station-management group 105 by transmitting a group deletion message 232 (FIG. 2B) or a station deletion message and enter the deletion wait state 306. During the deletion wait state 306, the access point 102 may wait for stations to acknowledge receipt of the group deletion message 232. After all stations 104 are deleted from the station-management group 105 or a retry limit is reached, the access point 102 may return to the idle state 301.

As illustrated in state diagram 300, the access point 102 may return to the idle state 301 from the group setup wait state 302 when no response frames are received from any of the selected stations 104 within a predetermined period of time. The access point 102 may also retry sending a station deletion message while in the deletion wait state 306 and return to the established state 304 if there is station remaining in the group.

Figure 4:
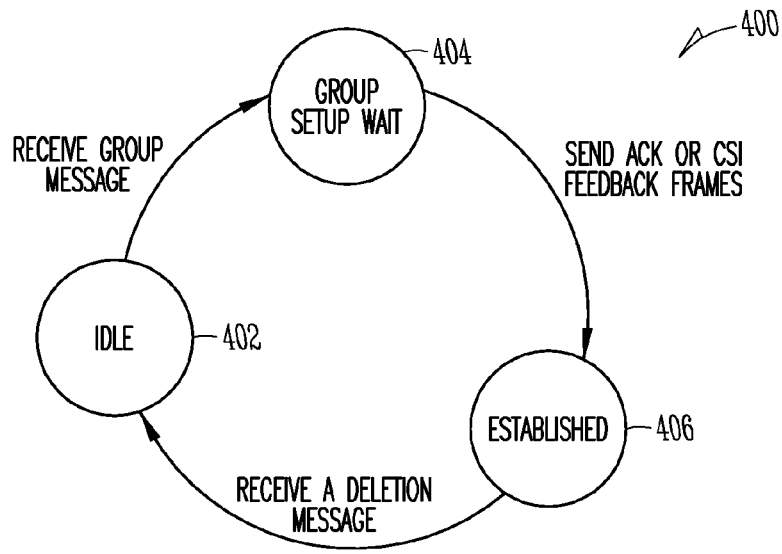
FIG. 4 is a state diagram for a station configured for explicit deletion of station-management groups in accordance with some embodiments.

FIG. 4 is a state diagram for a station configured for explicit deletion of station-management groups in accordance with some embodiments. A communication station, such as one of communication stations 104 (FIG. 1), may operate in accordance with state diagram 400. During idle state 402, the communication station 104 may receive a group allocation message 202 (FIG. 2A) from an access point 102 (FIG. 1) and enter group setup wait state 404. In response to the group allocation message 202, the communication station 104 may send a response frame, such as an ACK frame or a frame that includes CSI feedback, to indicate that it will join a station-management group 105 (FIG. 1) indicated in the group allocation message 202 and enter the established state 406. During the established state 406, the communication station 104 is a member of the station-management group 105 and may receive DL MU-MIMO transmission 240 (FIG. 2C) from the access point 102. In these explicit group deletion embodiments, the communication station 104 may remain in the established state 406 until it receives a group deletion message from the access point.

Figure 5:
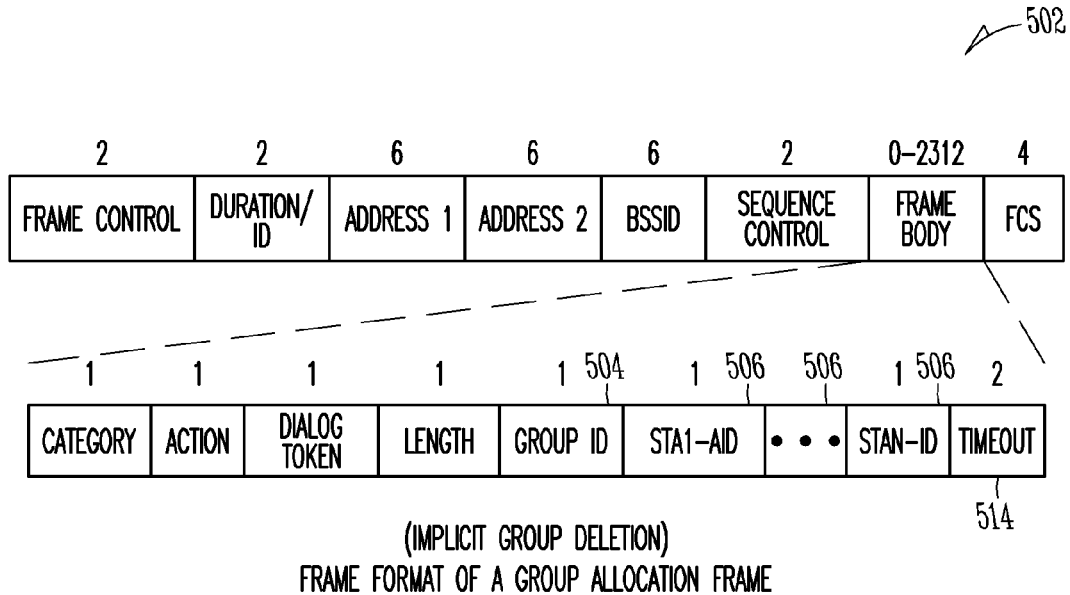
FIG. 5 illustrates the frame format of a group allocation message configured for implicit deletion of station-management groups in accordance with some embodiments.

FIG. 5 illustrates the frame format of a group allocation message configured for implicit deletion of station-management groups in accordance with some embodiments. The group allocation message 502 may be transmitted by the access point 102 (FIG. 1) to stations 104 (FIG. 1) that are selected to be part of a station-management group 105 (FIG. 1). The numbers above each field of the group allocation message 502 may indicate the length of each of the fields in octets.

In accordance with embodiments, the group allocation message 502 includes a group ID field 504 within the frame body to identify the station-management group 105 and a plurality of AID fields 506 to identify the associated IDs of the stations 104 that are being selected for the station-management group 105. The frame body of the group allocation message 502 may also include a timeout field 514 to indicate a maximum duration of group membership. In these embodiments, the access point 102 will automatically delete the station-management group when no group update messages or no DL MU-MIMO transmissions 240 are sent after the predetermined period of time indicated in timeout field 514 to the stations of the established station-management group 105. These embodiments are discussed in more detail below. In some embodiments, timeout field 514 may indicate a timeout interval in milliseconds.

The frame body of the group allocation message 502 may also include a category field indicating that the message is a group allocation message configured for implicit group deletion, an action field, and a length field indicating the length of the frame body. Other fields may be included in the frame body of the group allocation message 502, group allocation message 202 (FIG. 2A), and group deletion message 232 (FIG. 2B).

In these embodiments, station-management groups may be established for time periods ranging from 10 milliseconds to a much longer period such as hours. The establishment and reestablishment of station-management groups in both the explicit group deletion and implicit group deletion embodiments allows an access point to dynamically update and change members of a station-management group based on, among other things, traffic patterns of the individual stations and changing channel conditions.

Figure 6:
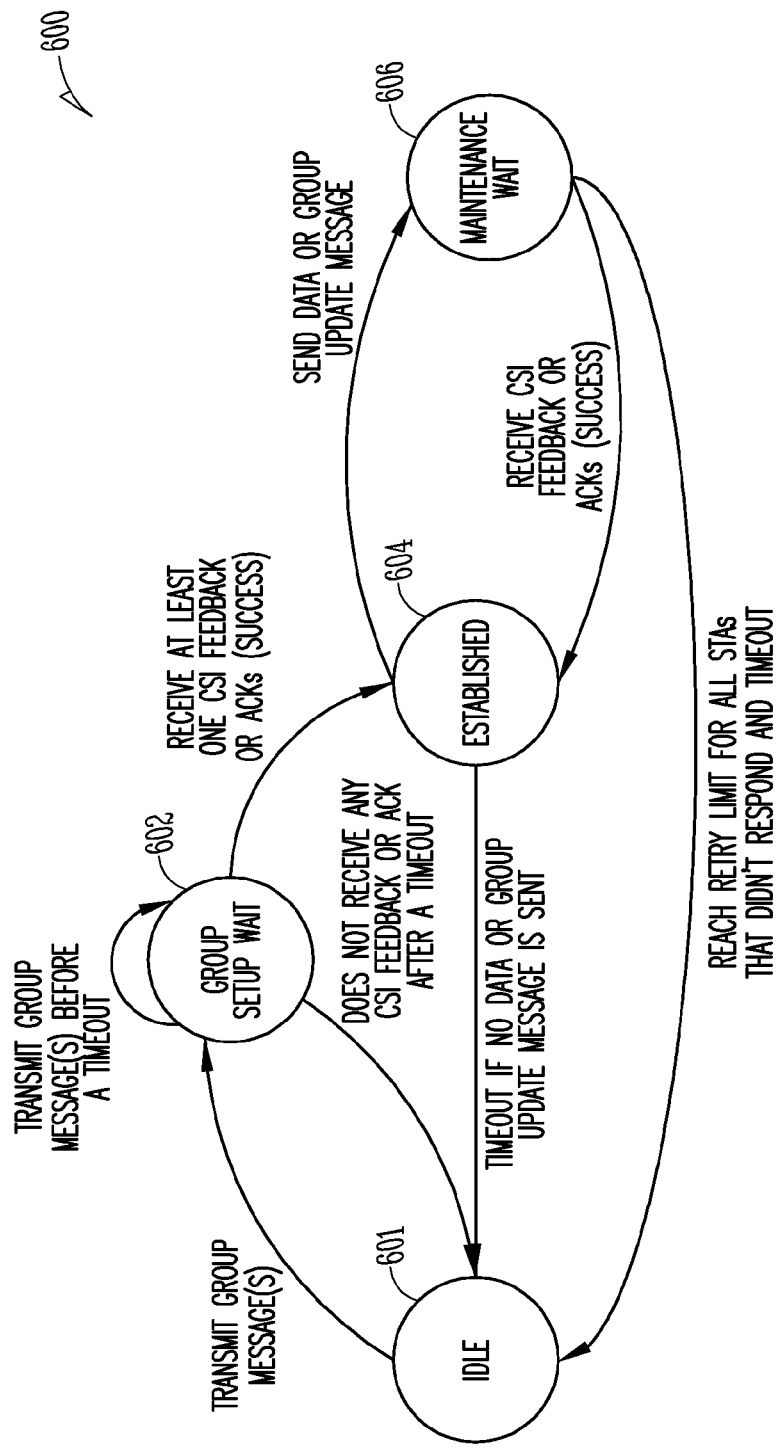
FIG. 6 is a state diagram for an access point configured for implicit deletion of station-management groups in accordance with some embodiments.

FIG. 6 is a state diagram for an access point configured for implicit deletion of station-management groups in accordance with some embodiments. An access point, such as access point 102 (FIG. 1) may operate in accordance with state diagram 600. During idle state 601, the access point 102 is idle with respect to station group management activities. After transmitting a group allocation message, such as group allocation message 502 (FIG. 5), to selected stations 104 (FIG. 1), the access point 102 may enter the group setup wait state 602. When response frames are received from one or more of the selected stations 104, the access point 102 may establish the station-management group 105 to include stations 104 from which response frames are received and enter the established state 604 and establish a station-management group 105 (FIG. 1). While in the established state 604, the access point 102 may transmit a DL MU-MIMO transmission 240 (FIG. 2C) to the stations 104 of the station-management group 105. While in the established state 604, the access point 102 may implicitly delete the station-management group 105 by refraining from transmitting DL MU-MIMO transmissions 240 or group update messages to the stations 104 of the established station-management group 105 after a predetermined period of time indicated in timeout field 514 (FIG. 5) and return to idle state 601. While in the established state 604, the access point 102 may enter maintenance wait state 606 while waiting for acknowledgement frames or CSI feedback from stations 104 in response to a DL MU-MIMO transmission 240. Data packets may be retransmitted when acknowledgements are not received in accordance with conventional techniques.

As illustrated in state diagram 600, the access point 102 may return to the idle state 601 from the group setup wait state 602 when no response frames are received from any of the selected stations 104 within a predetermined period of time. The access point 102 may also return to the idle state 601 after a predetermined period of time after a retry limit is reached for stations that do not respond with to the a DL MU-MIMO transmission 240.

Figure 7:
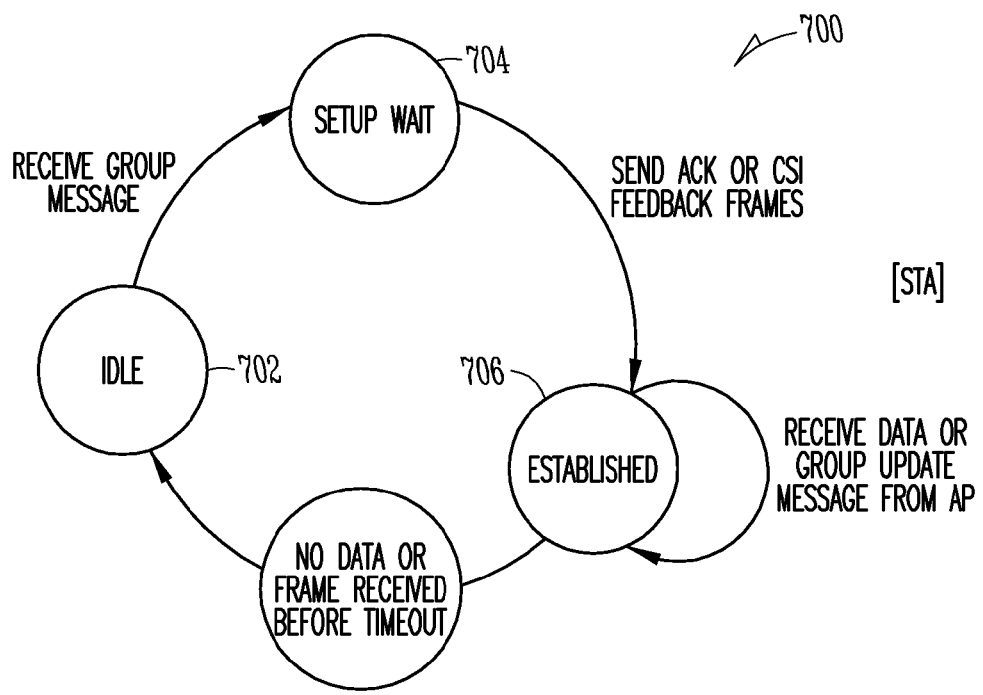
FIG. 7 is a state diagram for a station configured for implicit deletion of station-management groups in accordance with some embodiments.

FIG. 7 is a state diagram for a communication station configured for implicit deletion of station-management groups in accordance with some embodiments. A communication station, such as one of communication stations 104 (FIG. 1), may operate in accordance with state diagram 700. During idle state 702, the communication station 104 may receive a group allocation message 502 (FIG. 5) from an access point 102 (FIG. 1) and enter group setup wait state 704. In response to the group allocation message 502, the communication station 104 may send a response frame, such as an ACK frame or a frame including CSI feedback, to indicate that it will join the indicated station-management group and enter the established state 706. During the established state 706, the communication station 104 may receive DL MU-MIMO transmissions 240 (FIG. 2C) from the access point 102. The communication station 104 may remain in the established state 706 until it no longer receives any DL MU-MIMO transmissions 240 or group update messages for the predetermined period of time indicated in timeout field 514 (FIG. 5) of the group allocation message 502.

Referring to FIGS. 1, 2A, 2B, 2C, and 5 as discussed above, the access point 102 is configured to set up and manage one or more station-management groups 105 by transmitting a group allocation message to selected stations 104. Group allocation message 202 (FIG. 2A) may be transmitted when the access point 102 employs explicit group deletion, and group allocation message 502 (FIG. 5) may be transmitted when the access point 102 employs implicit group deletion. The access point 102 may establish the station-management group 105 to include stations from which response frames are received. The access point 102 may transmit DL MU-MIMO transmissions 240 to the stations of the station-management group 105 using a MU-MIMO technique. The access point 102 may either explicitly delete the station-management group by transmitting a group deletion message 232 to the stations of the group or implicitly delete the station-management group by refraining from transmitting DL MU-MIMO transmissions 240 or group update messages to the stations of the group for a predetermined period of time. In some embodiments, the access point 102 may concurrently establish more than one station-management group.

In some embodiments, the response frames are transmitted by at least some of the selected stations 104 in response to receipt of a group allocation message 202 or 502, and the access point 102 establishes the station-management group 105 to include stations 104 from which response frames are received within a predetermined period of time. In these embodiments, the response frames are acknowledge frames, and all stations that receive a group allocation message send back an acknowledge frame. Based on the receipt of acknowledge frames, the access point 102 may decide which of the stations to include in the station management group.

In some embodiments, the access point 102 may attempt to establish a station-management group 105 within a predetermined period of time. During this period of time, the access point 102 may transmit one or more group allocation messages to selected stations 104. Stations 104 that respond within this period of time may become part of the indicated station-management group 105.

In some embodiments, the access point 102 may explicitly delete one or more stations 104 from the established station-management group 105 by transmitting a group deletion message 232 to one or more of the stations 104 of the established station-management group 105. In some embodiments, the access point 102 may implicitly delete one or more stations 104 from an established station-management group 105 by refraining from transmitting a DL MU-MIMO transmission 240 or group update messages to one or more stations 104 for a predetermined period of time. Stations 104 that are deleted from the station-management group may be deleted from a memory of the access point 102 that identifies stations currently part of a station-management group.

When the access point 102 is configured for implicit group deletion, no explicit messages need to be transmitted to the stations 104 of an established station-management group 105 to indicate that stations are being removed or the station-management group 105 is being deleted. The stations of the station-management group 105 are automatically deleted as discussed above by refraining from transmitting DL MU-MIMO transmissions 240 or group update messages for a predetermined period of time.

When the access point 102 is configured for explicit deletion, stations 104 may respond to the group deletion message 232 with an acknowledgement frame. These responding stations 104 may be deleted from the station-management group 105 after the acknowledgement frame is received by the access point 102.

As discussed above, a DL MU-MIMO transmission 240 may comprise a concurrent transmission of spatially-separated data packets 250 to at least some of the stations 104 of the station management group 105 employing a DL MU MIMO or DL SDMA technique. In some embodiments, beamforming may be employed by the access point 102 as well as the stations 104 for transmitting and receiving. In some embodiments, a station-management group may be a DL SDMA group when an SDMA technique is used to transmit DL MU-MIMO transmissions 240.

In embodiments that employ DL-SDMA, the individual data packets 251, 252, and 253 may be precoded based on a CSI matrix for the stations 104 of the station-management group 105. In these embodiments, the precoding matrix may be generated from the CSI for each station 104, and the precoding matrix may be used to precode the individual data packets for concurrent transmission within a DL MU-MIMO transmission 240. The stations 104 include processing circuitry to separate their packet from packets intended for other stations based on the station's CSI or the CSI matrix. In some of these embodiments, the group allocation message 202 may be used as a sounding frame by the stations 104 to determine their CSI.

The access point 102 may be configured to select stations 104 for the station-management group 105 based on the CSI of the stations 104 associated with the access point within the BSS 100. Stations 104 having a greatest difference between their CSI's may be selected for a station-management group 105, although this is not a requirement. In these embodiments, the greater difference in CSI's between stations 104 of a station-management group 105 may provide for a greater spatial channel separation by precoding, making it easier for a station 104 to separate out its data packet from the other data packets within a DL MU-MIMO transmission 240. In some embodiments, based on interfering patterns of different peer-to-peer links 107 between peer stations 104, the access point 102 may select stations 104 for different station-management groups 105 and 115 so that peer-to-peer links 107 within a group can be used to communicate simultaneously without causing interference to each other's directional transmissions. Although FIG. 1 illustrates stations 104 of station-management group 105 being located together and stations of station-management group 115 being located together, this may not be the case when stations 104 are selected for a station-management group based on their CSI.

In some embodiments, when the access point 102 has buffered traffic for a station 104 after the station 104 is removed from a station-management group 105 (either explicitly or implicitly), the access point 102 may transmit the buffered traffic as unicast traffic to the station rather than transmitting the traffic as part of a DL MU-MIMO transmission 240.

In some embodiments, a station 104 may be removed from a group if the station's CSI has changed (e.g., if the CSI of the station 104 is not sufficiently different from the CSI of other stations to allow for sufficient signal separation by precoding) or if there has been no traffic for the station 104.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An access point configured to:
   establish a station-management group including selected stations;
   transmit a unicast group allocation message to a station to indicate whether the station is part of the station management group;
   transmit data frames to the station in a downlink (DL) multi-user multiple-input multiple-output (MU-MIMO) transmission;
   delete the station from the station-management group; and
   implicitly delete the station from the station-management group by refraining, for a predetermined period of time, from transmitting DL MU-MIMO transmissions or group update messages to the station, the access point further being configured to not transmit a message to the station to inform the station of its deletion from the station-management group.

2. The access point of claim 1, further configured to configure the group allocation message to include a timeout field to indicate a predetermined period of time for implicitly deleting the station-management group after the access point refrains from transmitting DL MU-MIMO transmissions or group update messages to the stations of the station-management group, and
   wherein the access point is further configured to transmit the group update messages or the DL MU-MIMO transmissions to the stations of the station-management group within the predetermined period of time to maintain establishment of the station-management group.

3. An access point configured to:
   establish a station-management group including selected stations;
   transmit a unicast group allocation message to a station to indicate whether the station is part of the station management group;
   transmit data frames to the station in a downlink (DL) multi-user multiple-input multiple-output (MU-MIMO) transmission; and
   delete the station from the station-management group,
   wherein the access point is further configured to be part of a basic-service set (BSS) that operates in accordance with an IEEE 802.11 standard,
   wherein the access point is configured to select stations from the BSS for the station-management group, and
   wherein the access point and the stations implement a CSMA/CA technique of an IEEE 802.11 standard for accessing a wireless medium.

4. The access point of claim 3, further configured to transmit a message to the station to inform the station of its explicit deletion from the station-management group.

5. The access point of claim 3, further configured to receive an acknowledgment (ACK) frame or channel state information (CST) from the station in response to receipt by the station of the group allocation message.

6. The access point of claim 3, wherein the DL MU MIMO transmission is a transmission in accordance with a channel-sense multiple-access with collision avoidance (CSMA/CA) technique, and
   wherein the access point is configured to receive individual acknowledgements from the stations of the station-management group, the acknowledgements having been transmitted by the stations in accordance with a CSMA/CA technique.

7. The access point of claim 3, wherein the individual data packets in the DL MU MIMO transmission are precoded based on channel state information (CSI) for each of the stations of the station-management group.

8. The access point of claim 3, wherein the access point is configured to select stations from the BSS for the station-management group based on channel state information (CSI) or traffic patterns,
   wherein the access point implements a CSMA/CA technique of an IEEE 802.11 standard for accessing a wireless medium.

9. A mobile station configured to:
   receive a unicast group allocation message from an access point, the message indicating whether the station is part of a station management group of selected stations;
   receive data frames from the access point in a downlink (DL) multi-user multiple-input multiple-output (MU-MIMO) transmission; and
   receive a message from the access point regarding deletion of the mobile station from the station-management group,
   wherein the message from the access point includes a timeout field indicating a predetermined period of time within which the access point must transmit a DL MU-MIMO transmission or a group update message to the station in order to prevent the station from being deleted from the station management group.

10. A mobile station configured to:
    receive a unicast group allocation message from an access point, the message indicating whether the station is part of a station management group of selected stations;
    receive data frames from the access point in a downlink (DL) multi-user multiple-input multiple-output (MU-MIMO) transmission; and
    receive a message from the access point regarding deletion of the mobile station from the station-management group,
    wherein the mobile station is configured to:
    be part of a basic-service set (BSS) that operates in accordance with an IEEE 802.11 standard; and
    implement a CSMA/CA technique of an IEEE 802.11 standard for accessing a wireless medium.

11. The mobile station of claim 10, wherein the message from the access point is to inform the station of its explicit deletion from the station-management group.

12. The mobile station of claim 10, further configured to send an acknowledgment (ACK) frame or channel-state information (CSI) to the access point in response to receipt of the group allocation message.

13. The mobile station of claim 10, wherein the DL MU MIMO transmission is a transmission in accordance with a CSMA/CA technique, and
    wherein the mobile station is further configured to, after receipt of the DL MU-MIMO transmission, send the ACK frame in accordance with a CSMA/CA technique.

14. The mobile station of claim 10, further configured to send channel state information (CSI) feedback to the access point.

15. A method of operating an access point in a wireless network comprising:
    establishing a station-management group including selected stations;
    transmitting a unicast group allocation message to a station to indicate whether the station is part of the station management group;

transmitting data frames to the station in a downlink (DL) multi-user multiple-input multiple-output (MU-MIMO) transmission; and deleting the station from the station-management group, deleting includes implicitly deleting the station from the station-management group by refraining, for a predetermined period of time, from transmitting DL MU-MIMO transmissions or group update messages to the station, and by not transmitting a message to the station to inform the station of its deletion from the station-management group.

16. The method of claim 15, further comprising including a time-out field in the group allocation message indicating a predetermined period of time within which the access point must transmit a DL MU-MIMO transmission or a group update message to the station in order to prevent the station from being deleted from the station management group.

17. A method of operating an access point in a wireless network comprising:
establishing a station-management group including selected stations;
transmitting a unicast group allocation message to a station to indicate whether the station is part of the station management group;
transmitting data frames to the station in a downlink (DL) multi-user multiple-input multiple-output (MU-MIMO) transmission; and
deleting the station from the station-management group, wherein the access point is configured to be part of a basic-service set (BSS) that operates in accordance with an IEEE 802.11 standard,
wherein the access point is configured to select stations from the BSS for the station-management group, and
wherein the access point and the stations implement a CSMA/CA technique of an IEEE 802.11 standard for accessing a wireless medium.

18. The method of claim 17, further including transmitting a message to the station to inform the station of its deletion from the station-management group.

19. The method of claim 17, further comprising receiving an acknowledgment (ACK) frame or channel state information (CST) from the station in response to receipt by the station of the group allocation message.

20. The method of claim 17, wherein the DL MU MIMO transmission is a transmission in accordance with a channel-sense multiple-access with collision avoidance (CSMA/CA) technique, and
the method further including receiving individual acknowledgements from the stations of the station-management group, the acknowledgements having been transmitted by the stations in accordance with a CSMA/CA technique.

21. The method of claim 17, further including precoding the individual data packets in the DL MU MIMO transmission based on channel state information (CSI) for each of the stations of the station-management group.

22. The method of claim 17, wherein establishing includes selecting stations from the BSS for the station-management group based on channel state information (CSI) or traffic patterns, the method further including implementing a CSMA/CA technique of an IEEE 802.11 standard for accessing a wireless medium.

23. A method of operating a mobile station in a wireless network comprising:

receiving a unicast group allocation message from an access point, the message indicating whether the station is part of a station management group of selected stations;
receiving data frames from the access point in a downlink (DL) multi-user multiple-input multiple-output (MU-MIMO) transmission; and
receiving a message from the access point deleting the mobile station from the station-management group, wherein the mobile station is configured to be part of a basic-service set (BSS) that operates in accordance with an IEEE 802.11 standard, the method further including implementing a CSMA/CA technique of an IEEE 802.11 standard for accessing a wireless medium.

24. The method of claim 23, further including sending an acknowledgment (ACK) frame or channel-state information (CSI) to the access point in response to receipt of the group allocation message.

25. The method of claim 23, wherein the DL MU MIMO transmission is a transmission in accordance with a CSMA/CA technique, the method further including, after receipt of the DL MU-MIMO transmission, sending the ACK frame in accordance with a CSMA/CA technique.

26. The method of claim 23, further including sending channel state information (CSI) feedback to the access point.

27. A system including a radio transceiver, processing circuitry, and a memory, the system being configured to:
establish a station-management group including selected stations;
transmit a unicast group allocation message to a station to indicate whether the station is part of the station management group;
transmit data frames to the station in a downlink (DL) multi-user multiple-input multiple-output (MU-MIMO) transmission, and
delete the station from the station-management group, wherein the system is further configured to implicitly delete the station from the station-management group by refraining, for a predetermined period of time, from transmitting DL MU-MIMO transmissions or group update messages to the station, the system further being configured to not transmit a message to the station to inform the station of its deletion from the station-management group.

28. A system including a radio transceiver, processing circuitry, and a memory, the system being configured to:
establish a station-management group including selected stations;
transmit a unicast group allocation message to a station to indicate whether the station is part of the station management group;
transmit data frames to the station in a downlink (DL) multi-user multiple-input multiple-output (MU-MIMO) transmission; and
delete the station from the station-management group, wherein the system is further configured to configure the group allocation message to include a timeout field to indicate a predetermined period of time for implicitly deleting the station-management group after the system refrains from transmitting DL MU-MIMO transmissions or group update messages to the stations of the station-management group, and
wherein the system is further configured to transmit the group update messages or the DL MU-MIMO transmissions to the stations of the station-management group within the predetermined period of time to maintain establishment of the station-management group.

29. A system including a radio transceiver, processing circuitry, and a memory, the system being configured to:
   establish station-management group including selected stations;
   transmit a unicast group allocation message to a station to indicate whether the station is part of the station management group;
   transmit data frames to the station in a downlink (DL) multi-user multiple-input multiple-output (MU-MIMO) transmission; and
   delete the station from the station-management group,
   wherein the system is further configured to be part of a basic-service set (BSS) that operates in accordance with an IEEE 802.11 standard,
   wherein the system is configured to select stations from the BSS for the station-management group, and
   wherein the system and the stations implement a CSMA/CA technique of an IEEE 802.11 standard for accessing a wireless medium.

30. The system of claim 29, further configured to transmit a message to the station to inform the station of its explicit deletion from the station-management group.

31. The system of claim 29, further configured to receive an acknowledgment (ACK) frame or channel state information (CSI) from the station in response to receipt by the station of the group allocation message.

32. The system of claim 29, wherein the DL MU MIMO transmission is a transmission in accordance with a channel-sense multiple-access with collision avoidance (CSMA/CA) technique, and
   wherein the system is configured to receive individual acknowledgements from the stations of the station-management group, the acknowledgements having been transmitted by the stations in accordance with a CSMA/CA technique.

33. The system of claim 29, wherein the individual data packets in the DL MU MIMO transmission are precoded based on channel state information (CSI) for each of the stations of the station-management group.

34. The system of claim 29, further configured to select stations from the BSS for the station-management group based on channel state information (CSI) or traffic patterns,
   wherein the system implements a CSMA/CA technique of an IEEE 802.11 standard for accessing a wireless medium.

35. A system including a radio transceiver, processing circuitry and memory, the system configured to:
   receive a unicast group allocation message from an access point, the message indicating whether a station is part of a station management group of selected stations;
   receive data frames from the access point in a downlink (DL) multi-user multiple-input multiple-output (MU-MIMO) transmission; and
   receive a message from the access point regarding deletion of the mobile station from the station-management group,
   wherein the message from the access point includes a time-out field indicating a predetermined period of time within which the access point must transmit a DL MU-MIMO transmission or a group update message to the station in order to prevent the station from being deleted from the station management group.

36. A system including a radio transceiver, processing circuitry and memory, the system configured to:
   receive a unicast group allocation message from an access point, the message indicating whether a station is part of a station management group of selected stations;
   receive data frames from the access point in a downlink (DL) multi-user multiple-input multiple-output (MU-MIMO) transmission; and
   receive a message from the access point regarding deletion of a mobile station from the station-management group,
   wherein the is configured to:
   be part of a basic-service set (BSS) that operates in accordance with an IEEE 802.11 standard; and
   implement a CSMA/CA technique of an IEEE 802.11 standard for accessing a wireless medium.

37. The system of claim 36, wherein the message from the access point is to inform the station of its explicit deletion from the station-management group.

38. The system of claim 36, further configured to send an acknowledgment (ACK) frame or channel-state information (CSI) to the access point in response to receipt of the group allocation message.

39. The system of claim 36, wherein the DL MU MIMO transmission is a transmission in accordance with a CSMA/CA technique, and
   wherein the mobile station is further configured to, after receipt of the DL MU-MIMO transmission, send the ACK frame in accordance with a CSMA/CA technique.

40. The system of claim 36, further configure to send channel state information (CSI) feedback to the access point.

41. A computer-readable storage medium containing instructions that, if executed, cause a processor to:
   establish a station-management group including selected stations;
   transmit a unicast group allocation message to a station to indicate whether the station is part of the station management group;
   transmit data frames to the station in a downlink (DL) multi-user multiple-input multiple-output (MU-MMIMO) transmission; and
   delete the station from the station-management group,
   wherein the instructions, if executed, further cause the processor:
   to implicitly delete the station from the station-management group by refraining, for a predetermined period of time, from transmitting DL MU-MIMO transmissions or group update messages to the station without transmitting a message to the station to inform the station of its deletion from the station-management group.

42. The computer-readable storage medium of claim 41, wherein the instructions, if executed, further cause the processor to receive an acknowledgment (ACK) frame or channel state information (CSI) from the station in response to receipt by the station of the group allocation message.

43. A computer-readable storage medium containing instructions that, if executed, cause a processor to:
   establish a station-management group including selected stations;
   transmit a unicast group allocation message to a station to indicate whether the station is part of the station management group;
   transmit data frames to the station in a downlink (DL) multi-user multiple-input multiple-output (MU-MIMO) transmission; and
   delete the station from the station-management group,
   wherein the instructions, if executed, cause the processor to send a message to the station including a time-out field indicating a predetermined period of time within which a DL MU-MIMO transmission or a group update message must be transmitted to the station in order to prevent the station from being deleted from the station management group.

44. A computer-readable storage medium containing instructions that, if executed, cause a processor to:
- establish a station-management group including selected stations;
- transmit a unicast group allocation message to a station to indicate whether the station is part of the station management group;
- transmit data frames to the station in a downlink (DL) multi-user multiple-input multiple-output (MU-MIMO) transmission; and
- delete the station from the station-management group,
- wherein the instructions, if executed, further cause the processor:
  - to operate as part of a basic-service set (BSS) in accordance with an IEEE 802.11 standard,
  - to select stations from the BSS for the station-management group, and
  - to implement a CSMA/CA technique of an IEEE 802.11 standard for accessing a wireless medium.

45. The computer-readable medium of claim 44, wherein the instructions, if executed, further cause the processor to transmit a message to the station to inform the station of its explicit deletion from the station-management group.

46. The computer-readable medium of claim 44, wherein the DL MU MIMO transmission is a transmission in accordance with a channel-sense multiple-access with collision avoidance (CSMA/CA) technique, and
- wherein the instructions, if executed, cause the processor to receive individual acknowledgements from the stations of the station-management group, the acknowledgements having been transmitted by the stations in accordance with a CSMA/CA technique.

47. The computer-readable medium of claim 44, wherein the individual data packets in the DL MU MIMO transmission are precoded based on channel state information (CSI) for each of the stations of the station-management group.

48. The computer-readable medium of claim 44, wherein the instructions, if executed, further cause the processor:
- to select stations from the BSS for the station-management group based on channel state information (CSI) or traffic patterns,
- to implement a CSMA/CA technique of an IEEE 802.11 standard for accessing a wireless medium.

49. A computer-readable storage medium containing instructions that, if executed, cause a processor to:
- receive a unicast group allocation message from an access point, the message indicating whether a station is part of a station management group of selected stations;
- receive data frames from the access point in a downlink (DL) multi-user multiple-input multiple-output (MU-MIMO) transmission; and
- receive a message from the access point regarding deletion of e computer-readable storage medium from the station-management group,
- wherein the message from the access point includes a time-out field indicating a predetermined period of time within which the access point must transmit a DL MU-MIMO transmission or a group update message to the station in order to prevent the station from being deleted from the station management group.

50. A computer-readable storage medium containing instructions that, if executed, cause a processor to:
- receive a unicast group allocation message from an access point, the message indicating whether a station is part of a station management group of selected stations;
- receive data frames from the access point in a downlink (DL) multi-user multiple-input multiple-output (MU-MIMO) transmission; and
- receive a message from the access point regarding deletion of the computer-readable storage medium from the station-management group,
- wherein the instructions, if executed, cause the processor to:
  - cause the station to be part of a basic-service set (BSS) that operates in accordance with an IEEE 802.11 standard; and
  - implement a CSMA/CA technique of an IEEE 802.11 standard for accessing a wireless medium.

51. The computer-readable storage medium of claim 50, wherein the message from the access point is to inform the station of its explicit deletion from the station-management group.

52. The computer-readable storage medium of claim 50, wherein the instructions, if executed, cause the processor to send an acknowledgment (ACK) frame or channel-state information (CSI) to the access point in response to receipt of the group allocation message.

53. The computer-readable storage medium of claim 50, wherein the DL MU MIMO transmission is a transmission in accordance with a CSMA/CA technique, the instructions, if executed, further causing the processor to, after receipt of the DL MU-MIMO transmission, send the ACK frame in accordance with a CSMA/CA technique.

54. The computer-readable storage medium of claim 50, wherein the instructions, if executed, further cause the processor to send channel state information (CSI) feedback to the access point.

* * * * *